United States Patent [19]

Baak

[11] 4,105,084
[45] Aug. 8, 1978

[54] POWER UNIT FOR GOLF CART AND THE LIKE

[76] Inventor: Albert E. Baak, 1650 San Pablo Dr., Lake San Marcos, Calif. 92069

[21] Appl. No.: 787,609

[22] Filed: Apr. 14, 1977

[51] Int. Cl.² .............................................. B62D 51/04
[52] U.S. Cl. .................................. 180/11; 180/19 R; 180/21; 280/DIG. 5
[58] Field of Search ................. 180/19 R, 19 H, 19 S, 180/11, 25 R, 21, 22, DIG. 3; 280/DIG. 5

[56] References Cited

U.S. PATENT DOCUMENTS

| | | | |
|---|---|---|---|
| 633,283 | 9/1899 | Dissosway | 180/11 |
| 2,812,824 | 11/1957 | Adams | 180/19 S |
| 2,973,823 | 3/1961 | Stentz | 180/11 |
| 3,059,713 | 10/1962 | Beggs | 180/19 R |
| 3,094,185 | 6/1963 | Racoosin | 180/11 |
| 3,815,699 | 6/1974 | Ganskopp | 180/11 |

*Primary Examiner*—John A. Pekar
*Attorney, Agent, or Firm*—Harris, Kern, Wallen & Tinsley

[57] ABSTRACT

A powered transport unit which may be removably adapted to a standard golf bag cart or the like of the type having a pair of oppositely disposed wheels. A battery and a motor sit at opposite ends of a pivotally mounted power frame positioned between the wheels of the cart. A powered drive wheel is aligned with the wheels of the cart. The relative positions of the battery, motor and pivotal mounting allows the unit to achieve a zero resultant force on the cart's handle at a chosen motor output. A power control unit adaptable to the handle of the cart allows the user to activate and regulate the action of the drive wheel.

10 Claims, 9 Drawing Figures

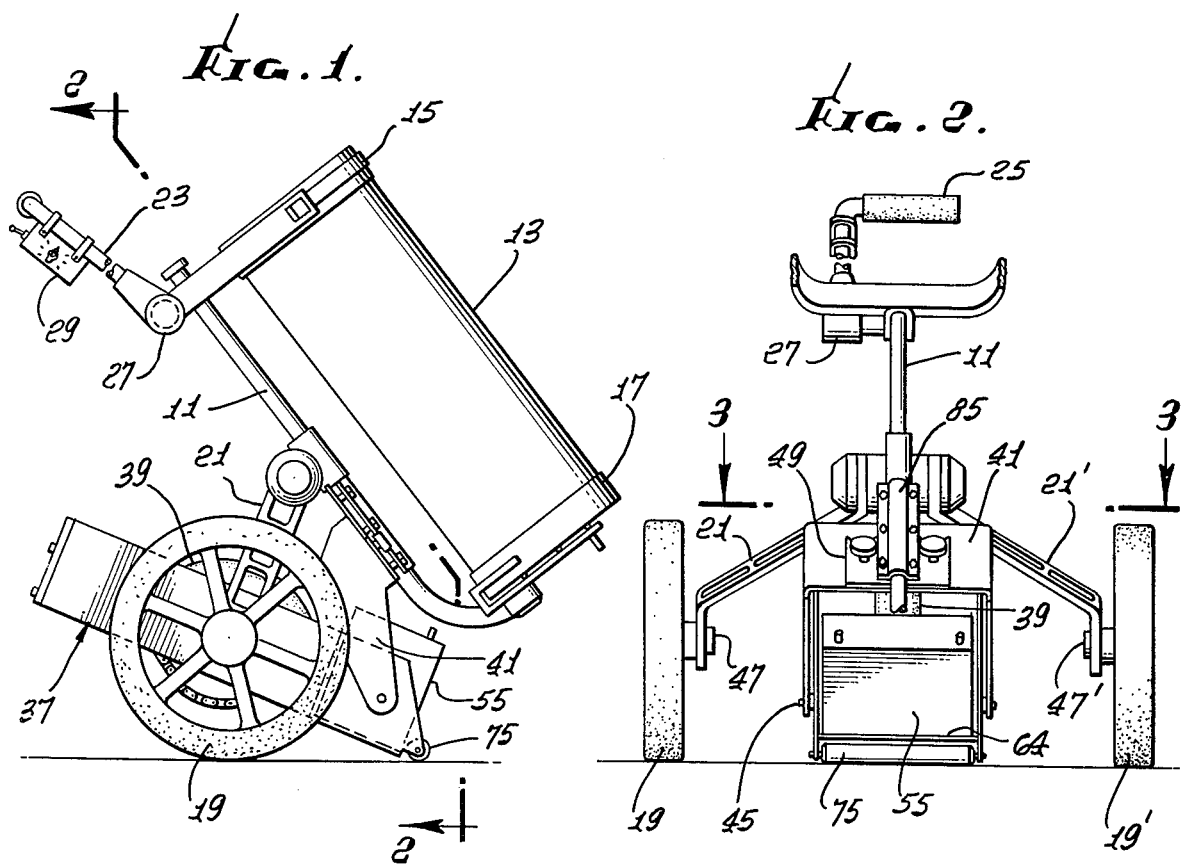
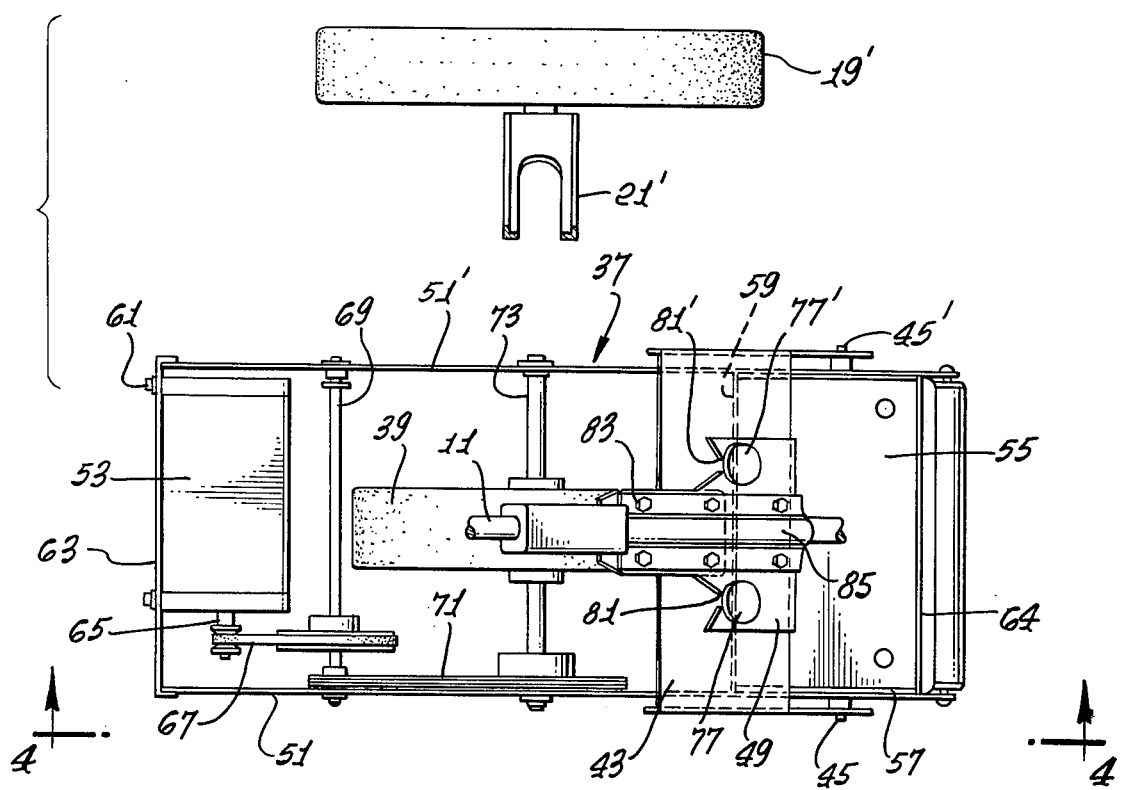

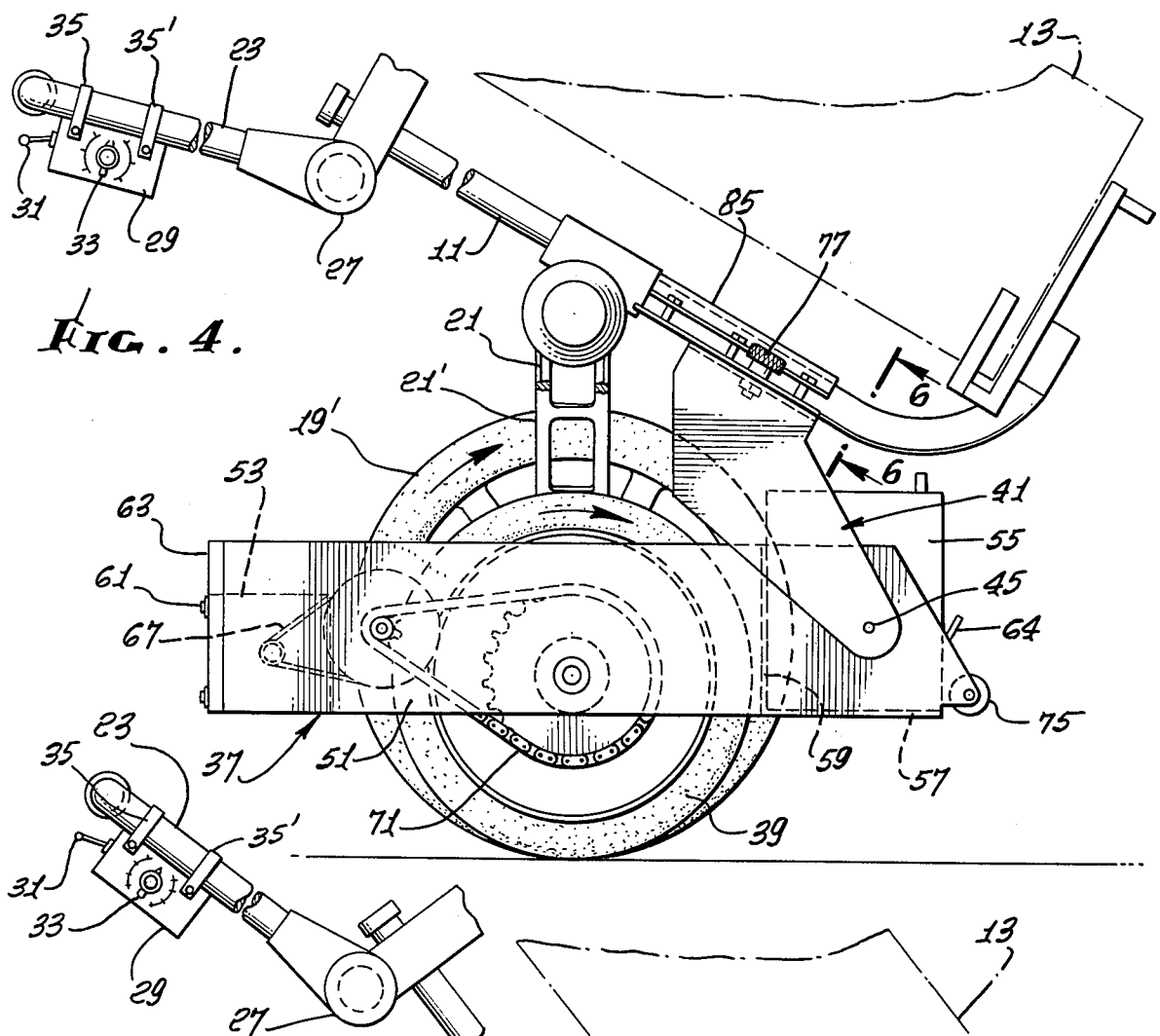
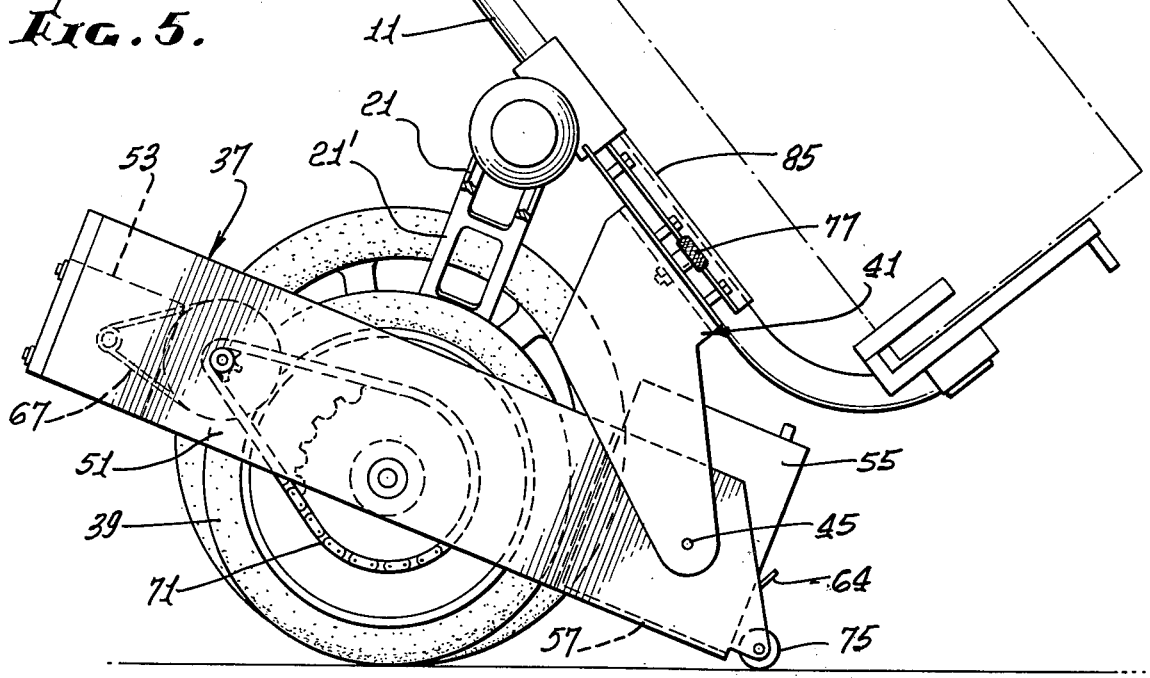

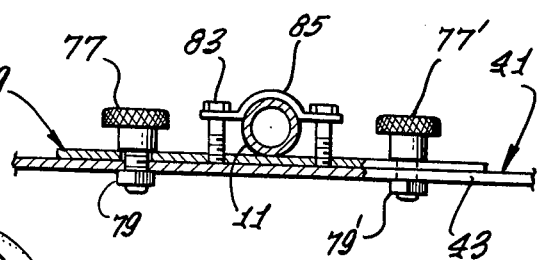
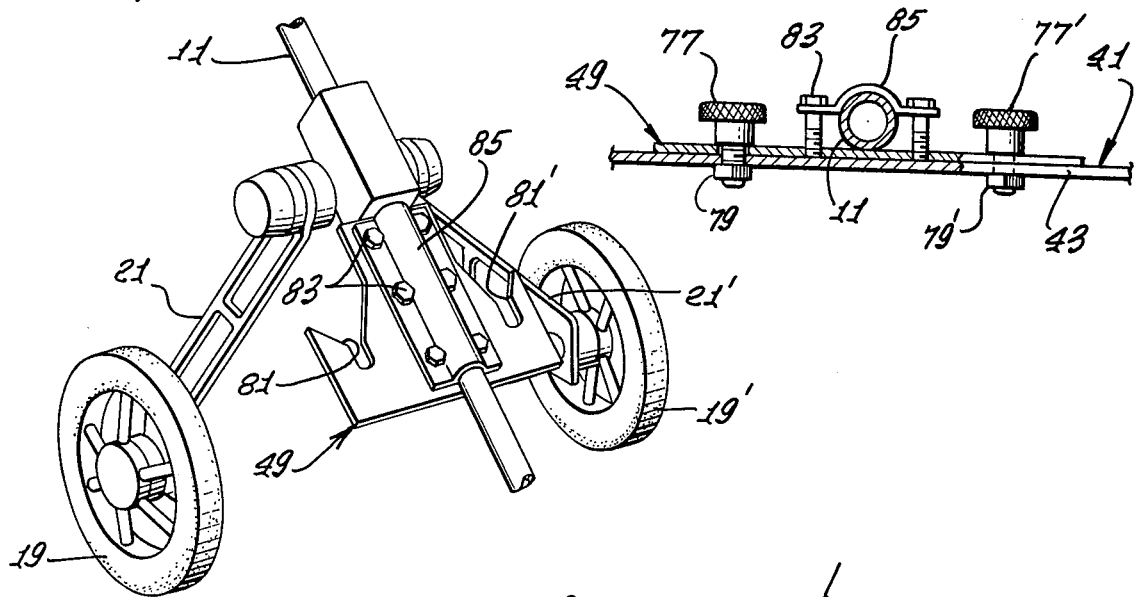
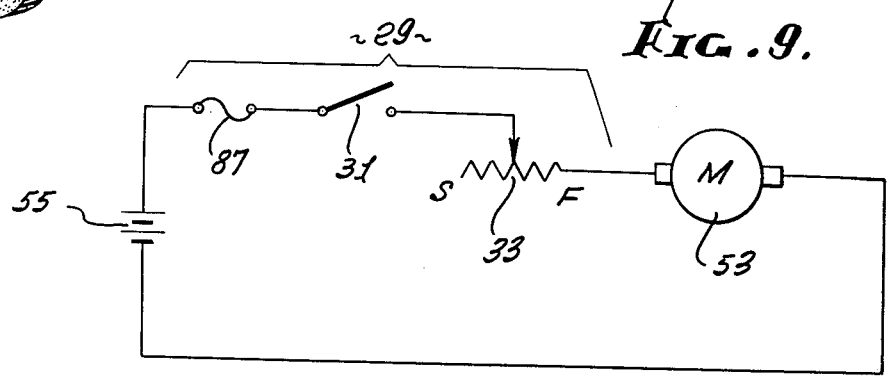
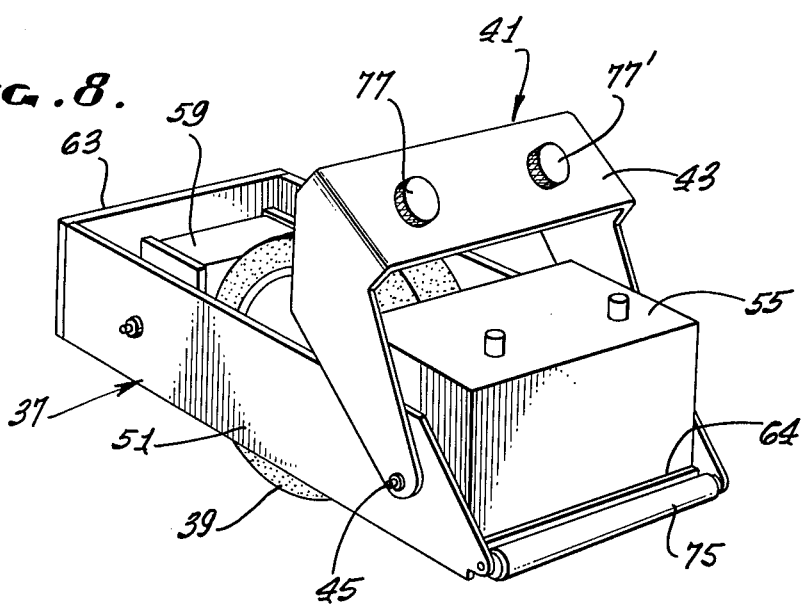

POWER UNIT FOR GOLF CART AND THE LIKE

BACKGROUND OF THE INVENTION

1. Field of the Invention

The present invention relates to means for powering a two-wheeled pull cart of the type commonly employed to transport a golf club bag. In particular, it relates to easily removable powered transport units which achieve a high degree of maneuverability over both even and uneven terrain.

2. Description of the Prior Art

The character of equipment employed in the game of golf combined with the fact that play of an eighteen hole round will commonly involve the traverse of 7,000 to 8,000 yards has led to the introduction of a variety of devices designed to aid transportation of the player's bag of clubs. Such bags are both bulky and heavy.

Carts which may be driven by a (seated) player are one solution. Such carts are disfavored by many sportsmen who prefer the healthful exercise of walking during the playing of a round. The carrying of a heavy bag throughout the game, however, is extremely tiring and detracts from the game of the typical weekend golfer. Arm and shoulder muscles become extremely fatigued during an eighteen hole round. Thus, a common compromise is the use by the golfer of a wheeled cart of the type which may be pulled or pushed around the course.

Such a cart, holding a heavy bag thereon, is a partial solution lessening the fatigue factor while allowing the golfer to obtain a healthful walk during his game. Although the fatigue is somewhat lessened, a common improvement has been to provide a means of powering the travel of such cart. Two main types of power units which presently exist are (i) those which feature the permanent incorporation of the unit into the cart design, as shown, for instance in Ganskopp, U.S. Pat. No. 3,815,699, and (ii) those which provide a readily detachable unit. Such detachable units are advantageous in terms of servicing, storage for safety, from both the elements and vandals, and transportability. Prior art units of this type commonly feature a motor powered drive wheel arrangement compatible with standard golf bag cart geometries. For example, Racoosin, U.S. Pat. No. 3,094,185, Adams, U.S. Pat. No. 2,812,824 and Beggs, U.S. Pat. No. 3,059,713 all employ such a third wheel, so arranged with respect to a two-wheeled cart as to result in a relatively triangular disposition of wheel ground contact points. Such a geometry may result in turning difficulty for the user, especially in view of the fact that the drive wheel is powered and not free-wheeling during travel. In Racoosin and Ganskopp, the operator must push down upon the handle of the cart to lift the front wheels prior to a change in direction. Adams provides a handle and swivel steering arrangement while Beggs requires the operation of a handle and caster-effect pivot. Also, the frequent employment of a large battery for power can further detract from the convenience of the user if such bulk is not compensated for in the design of the power unit. In Racoosin, Adams and Beggs, for instance, most of the battery's weight is supported by the two wheels of the cart.

SUMMARY OF THE INVENTION

The present invention essentially comprises a drive wheel powered by a DC motor to aid the movement of a two wheeled cart. The motor and drive wheel are mounted on a power frame which also encloses a battery. The battery and motor are mounted in opposite ends of the frame. The power frame is pivotally mounted to the cart to maintain the point of contact of the drive wheel with the earth on a line with the like points for the cart's two wheels and said points and the centers of rotation of all wheels coplanar throughout travel. The relative positions of the battery, motor and pivotal mounting may be so chosen to achieve no resultant force on the cart's handle at a chosen motor output. A manually operated power control unit, adaptable to the handle of the cart allows the user of the cart to activate, deactivate, and vary the output of the power unit. A roller, located at the rest edge of the power frame serves to protect turf and the power unit if the unit is energized before lifting the front.

OBJECTS OF THE INVENTION

An object of the present invention is to provide a powered travel unit of maximum maneuverability and minimal drag which may be detachably mounted to a standard two wheeled cart of the type commonly employed to transport a golf club bag.

Another object of this invention is to achieve the above object by means of a powered drive wheel pivotally mounted intermediate the two wheels of the cart.

Yet another object of the present invention is to achieve the above object by means which allows the user to manually adjust the power output thereof without bending.

Still another object of this invention is to achieve a compact powered travel unit which may be quickly and simply removed from the cart for safe storage and convenient transportation.

Yet still another object of this invention is to provide a maneuverable powered travel unit which may be adapted to a standard golf bag cart which minimizes degradation of the turf of a golf course.

Other objects, advantages and features of the present invention will be readily apparent from the following detailed description, wherein like numerals represent like features throughout.

BRIEF DESCRIPTION OF THE DRAWINGS

FIG. 1 is a side view of the present invention adapted to a cart having a golf club bag mounted thereon;

FIG. 2 is a front view of the present invention adapted to a standard golf bag cart taken along line 2—2 of FIG. 1;

FIG. 3 is a top view of the power frame apparatus of the present invention taken along line 3—3 of FIG. 2;

FIG. 4 is a side sectional view of the present invention adapted to a standard golf bag cart taken along line 4—4 of FIG. 3 (travel configuration);

FIG. 5 is a side sectional view of the present invention adapted to a standard golf bag cart (rest configuration);

FIG. 6 is an enlarged cross-sectional view of the quick connect bracket and associated joint of the present invention taken along line 6—6 of FIG. 4;

FIG. 7 is a partial perspective view of the quick connect bracket of the present invention as adapted to the tube frame of a standard golf bag cart;

FIG. 8 is a perspective view of the power frame and yoke of the present invention as detached from the quick connect bracket; and FIG. 9 is an electrical schematic of the present invention.

DESCRIPTION OF THE PREFERRED EMBODIMENT

The powered travel unit of the invention is shown in FIG. 1 adapted to a standard bag carry cart of the type commonly employed by golfers to conserve energy during a game. The cart is of the type that employs an elongated tube or frame 11 to which a golf bag 13 is attached by standard means, such as rear clamping means 15 and front clamping means 17. A pair of oppositely disposed wheels 19, 19' are attached to the cart by means of axle mounts 21, 21'. A handle 23, having a hand grip 25 as shown in FIG. 2, is joined to the cart at rotational joint 27 to provide the user with means for essentially balancing the basic cart with bag attached through a variety of handle 23 positions.

The present invention may be adapted to a cart of the sort described above and includes control unit 29 having on-off switch 31 and dial 33, adapted to the handle 23 by standard attachment means 35, 35', and power frame 37, which includes drive wheel 39. The power frame 37 is flexibly mounted to the cart by means of yoke 41. Yoke 41 is rigidly mounted to tube 11 at its cross member 43 and achieves a flexible mounting with respect to power frame 37 by means of pivotal members 45, 45'.

As can be seen in FIG. 2, the wheels 19, 19' of the cart, although aligned with respect to their centers of rotation, are free wheeling on independent axle shafts 47, 47'. This allows the relatively compact power frame 37 to be positioned so drive wheel 39 lies intermediate the wheels of the cart 19, 19'. By appropriate location of the quick connect bracket 49 along tube 11, a configuration is achieved on a standard cart whereby the point of contact of drive wheel 39 with the travel surface lies along a straight line formed by the point of contact of the wheels 19, 19' with the ground and the line joining the point of ground contact of drive wheel 39 with its center of rotation lies in the plane formed by the points of ground contact of the wheels 19, 19' and their respective centers of rotation. The aforementioned pivotal relationship between the power frame 37, to which drive wheel 39 is secured, and the body of the cart assures that the drive wheel 39 will maintain ground contact throughout changing terrain, thereby providing continual drive to the unit. Drive wheel 39 is located equidistant between the sides 51, 51' of power frame 37 and contacts the earth at the cart's center of rotation when the wheels 19, 19' are counter-rotated, as in the case of a sharp turn. In such a turn, the presence of the invention enhances maneuverability as a pivot point is created at the center of rotation, giving the user added control. No counter movement or inertia is created by introduction of the third wheel. The third wheel position eliminates any requirement for a differential gear mechanism and avoids scuffing in turning.

Turning now to FIG. 3, one may observe in detail the power frame 37 of the invention and its location relative to wheel 19' of the cart. From the top of the power frame 37 one may observe that the motor 53 and the battery 55 are oppositely positioned with respect to drive wheel 39. The battery 55 is positioned upon 57 and restrained from movement toward drive wheel 39 by wall 59. Bolt means 61 provide for the secure attachment of motor 53 to the end 63 of power frame 37. A lip 64 provides an additional retention feature, maintaining the battery 55 securely upon pad 57 regardless of the orientation of the power frame 37 relative to the ground plane.

Motor 53 is of the type having a drive shaft output 65. The drive shaft 65 is interconnected through first drive belt 67, intermediate power shaft 69, and second drive belt 71 to translate motor output to the shaft 73 of drive wheel 39. The motor 53, when activated, drives a clockwise rotation of wheel 39 as the cart to be powered by the unit of the present invention is of the push type. At rest, the weight of power frame 37 causes an upward-acting force at handle 23. A clockwise torque is induced in the drive wheel 39 when the motor is energized. This induces a CCW torque reaction which is in direct proportion to the load imposed on the drive wheel 39, i.e., driving on level hardtop path (low load condition) vs. uphill in deep rough (high load condition). The relative positions of pivotal members 45, 45' and of the motor 53 and the battery 55 within the power frame 37 are chosen with a view to minimizing the resultant vertical plane force on handle 23, due to the CCW torque reaction when the motor is energized, hence, minimizing inconvenience to the user during use. For example, in the preferred embodiment, the positioning of the motor 53 and the battery 55 is such as to utilize the CCW torque reaction, when the motor is energized, to cause a slight upward-acting force at handle 23 under a low load condition; a zero upward-acting or downward-acting force at handle 23 under "average" load condition; and a slight downward-acting force on handle 23 under high load condition.

FIGS. 4 and 5 illustrate the present invention in, respectively, travel (handle 23 depressed by user) and rest configurations. In FIGS. 4 and 5, a roller 75 is provided forward of the battery 55 end of power frame 37, spanning the width thereof. When the invention is in its rest configuration (FIG. 5), such roller 75 prevents the cart and its attached power unit from gouging the turf and grounds. Should the user energize the power unit prior to lifting the power frame 37, serious damage to valuable grounds will thereby be avoided. When operated in its travel (FIG. 4) configuration, the roller 75 makes no contact with the ground surface and thus will not interfere in any way with the maneuverability of the cart.

FIG. 6 is an enlarged cutaway view illustrating the manner of attachment of the yoke 41 (which, in turn, is pivotally engaged to power frame 37) to the elongated tube 11 of the cart. Cross member 43 of the yoke 41 has engaged thereto a pair of knobs 77, 77', each of which has a relatively broad top portion ultimately engaged and secured to cross member 43 by nuts 79, 79'. The narrowed shaft allows the engagement of quick connect bracket 49 at matching slotted portions 81, 81'. Tube 11 may be fixedly secured to quick connect bracket 49 by means of a plurality of bolts 83 which secure sheath 85, tube 11 and quick connect bracket 49 in a "sandwich" arrangement.

FIG. 7 illustrates the quick connect bracket 49 as positioned on the tube 11 absent the power frame 37 and associated apparatus. The geometry of the knobs 77, 77' relative to that of the slotted portions 81, 81' of quick connect bracket 49 permits the removal of the power frame 37 for storage or any of innumerable other reasons such as transportation, recharging the battery 55 or repair of motor 53. FIG. 8 illustrates the power frame 37 disengaged from quick connect bracket 49. Knobs 77, 77' provide the only points of contact between the cart and power frame 37 other than the (wire) conductors necessary to effectuate the control and supply electrical power, involving control unit 29, battery 55 and motor 53. As shown in FIGS. 7 and 8 the simple engagement and disengagement of the power frame 37 to the golf cart is simply and quickly achieved.

FIG. 9 illustrates the electro-mechanical operation of the system. Voltage is applied by battery 55 to motor 53 through power control unit 29. The operation of the motor 53, whose drive shaft 65 output is voltage-sensitive is controlled manually by the off-on switch 31 and voltage regulating potentiometer dial 33, allowing the user to energize and vary the pulling power of the invention. A fuse 87 may be provided to protect the system.

Thus it is seen that there is provided by the present invention a power unit which may be simply adapted to a common golf bag cart configuration or the like the use of which minimizes the handling and maneuverability difficulties commonly introduced by such mechanisms.

I claim:

1. A power unit to supply powered movement to a cart of the type having a frame, one pair of spaced and aligned support wheels, and a handle projecting from said frame generally perpendicular to the axis of said support wheels for manually pivoting said frame on said wheels in a vertical plane and for steering in a horizontal plane, including in combination:
    a manually operated control unit;
    an electric motor having a drive shaft output;
    a drive wheel adapted to be impelled by said drive shaft output;
    said drive shaft output of said electric motor being responsive to said manually operated control unit; and
    means for detachably securing the power unit to said frame and for positioning said drive wheel substantially centered between said support wheels so that the point of contact of said drive wheel with the ground is substantially aligned with the points of contact of said support wheels with the ground.

2. A power unit as defined in claim 1 wherein the point of contact of said drive wheel with the ground and the center of rotation of said drive wheel lies in the plane formed by the points of contact of said support wheels with the ground and the centers of rotation of said support wheels.

3. A power unit as defined in claim 1 wherein said manually operated control unit includes switching means and a battery; and including
    a power frame having a forward section, a trailing section, a top edge and a bottom edge;
    said drive wheel having a wheel shaft mounted on said power frame so that said drive wheel protrudes below said power frame;
    said motor being located in one of said trailing and leading sections of said power frame, and said battery being located in the other of said sections of said frame, with the weight of said frame and components distributed in said forward and trailing sections to produce a torque about the drive wheel axis to substantially counteract the torque reaction of said drive wheel at a normal operating load.

4. A power unit as defined in claim 3 which further comprises a yoke having:
    a cross-member and two approximately parallel sides;
    attachment means located on said cross-member for fixedly engaging said cart; and
    pivot means located in each of said sides to pivotally engage said power frame whereby said drive wheel is enabled to maintain contact with the surface of travel throughout changes in the terrain.

5. A power unit to supply powered movement to a cart of the type having a frame and a pair of spaced and aligned support wheels, including in combination:
    a manually operated control unit having switching means and a battery;
    an electric motor having a drive shaft output;
    a drive wheel adapted to be impelled by said dirve shaft output;
    said drive shaft output of said electric motor being responsive to said manually operated control unit;
    means for positioning said drive wheel intermediate and spaced from said support wheels so that the point of contact of said drive wheel with the ground is aligned with the points of contact of said support wheels with the ground;
    a power frame having a forward section, a trailing section, a top edge and a bottom edge;
    said drive wheel having a wheel shaft fixed to said drive wheel and rotatably mounted on said power frame so that said drive wheel protrudes below said power frame;
    said motor being located in said trailing section of said power frame, said battery being located in said forward section of said frame and said wheel shaft being attached to said power frame;
    a yoke having a cross-member and two approximately parallel sides,
    attachment means located on said cross-member for fixedly engaging said cart and having a pair of knobs, and
    pivot means located in each of said sides to pivotally engage said power frame whereby said drive wheel is enabled to maintain contact with the surface of travel throughout changes in the terrain; and
    a bracket mounted on the elongated portion of said cart, said bracket having a pair of slots therein spaced apart an amount equal to the spacing of said knobs whereby said knobs and said brackets form a quick connect joint for the engagement of the cart and the unit to supply powered movement at the power frame.

6. A power unit as defined in claim 5 wherein said power unit additionally comprises a cylindrical roller mounted to said power frame and located approximately at said bottom edge of said forward section.

7. A motorized cart including in combination:
    an elongated frame;
    one pair of oppositely disposed and aligned support wheels, with each of said wheels joined to said frame by an axle mount;
    a handle projecting from said frame generally perpendicular to the axis of said support wheels for manually pivoting said frame on said wheels in a vertical plane and for steering in a horizontal plane;
    a manually operated control unit for mounting on said frame;
    a motor for attachment to said frame and in electrical connection with said control unit, and
    a single drive wheel mechanically coupled to said motor and substantially centered between said support wheels so that the point of contact of said drive wheel with the ground lies in a substantially straight line with the points of contact of said support wheels with the ground.

8. A cart as defined in claim 7 wherein the point of contact of said drive wheel with the ground and the center of rotation of said drive wheel lies in the plane formed by the points of contact of said support wheels with the ground and the centers of rotation of each of said support wheels.

9. A motorized cart as defined in claim 7 wherein said manually operated control unit includes switching means and a battery; and said cart further includes a power frame having a forward section, a trailing section, a top edge and a bottom edge;

said drive wheel having a wheel shaft mounted on said power frame so that said drive wheel protrudes below said power frame;

said motor being located in one of said trailing and leading sections of said power frame, and said battery being located in the other of said sections of said frame, with the weight of said frame and components distributed in said forward and trailing sections to produce a torque about the drive wheel axis to substantially counteract the torque reaction of said drive wheel at a normal operating load.

10. A motorized cart as defined in claim 9 including a yoke having a cross-member and two approximately parallel sides;

said yoke having attachment means located on said cross-member for fixedly engaging said elongated frame; and said yoke having pivot means located in each of said sides to pivotally engage said power frame whereby said drive wheel is enabled to maintain contact with the surface of travel throughout changes in the terrain.

* * * * *